July 12, 1966
C. EISLER
3,260,583
METHOD OF SEALING GLASS TUBES
Filed Feb. 21, 1963
3 Sheets-Sheet 1
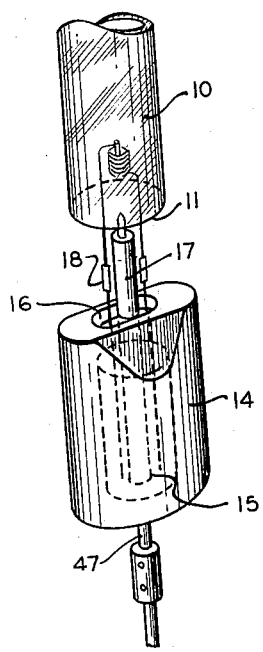
FIG. 1
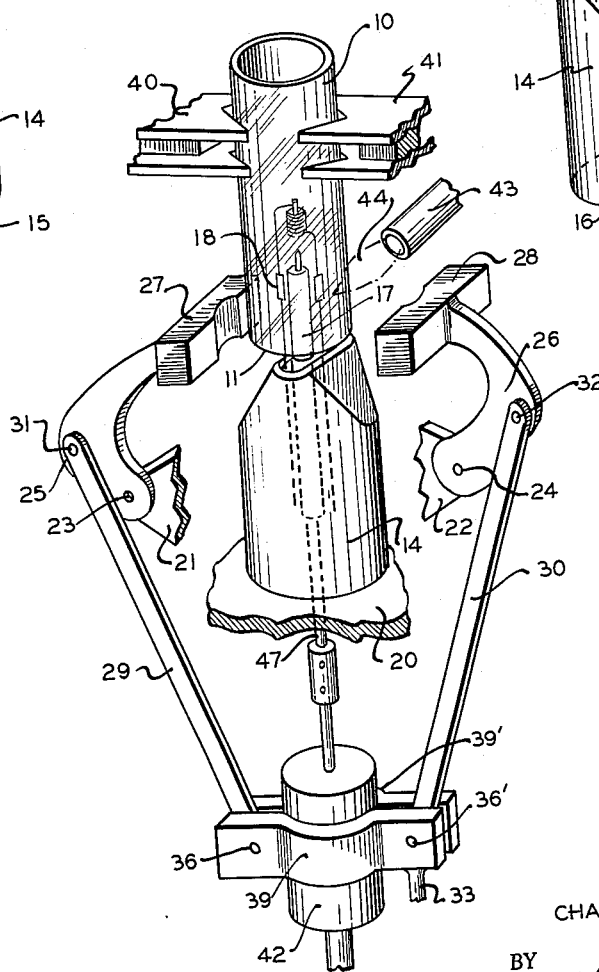
FIG. 3
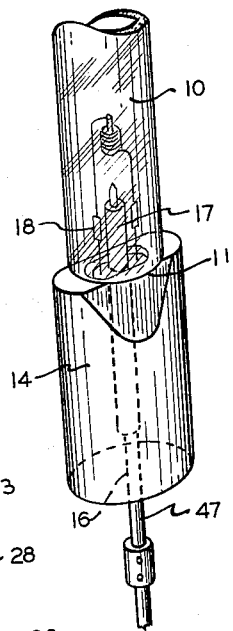
FIG. 2
INVENTOR.
CHARLES EISLER
BY
ATTORNEY July 12, 1966
C. EISLER
3,260,583
METHOD OF SEALING GLASS TUBES
Filed Feb. 21, 1963
3 Sheets-Sheet 2
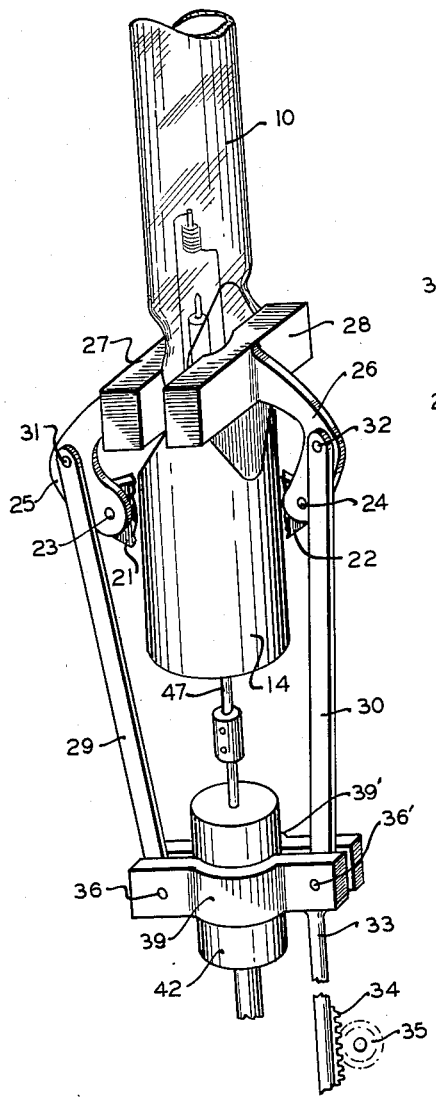
FIG. 4
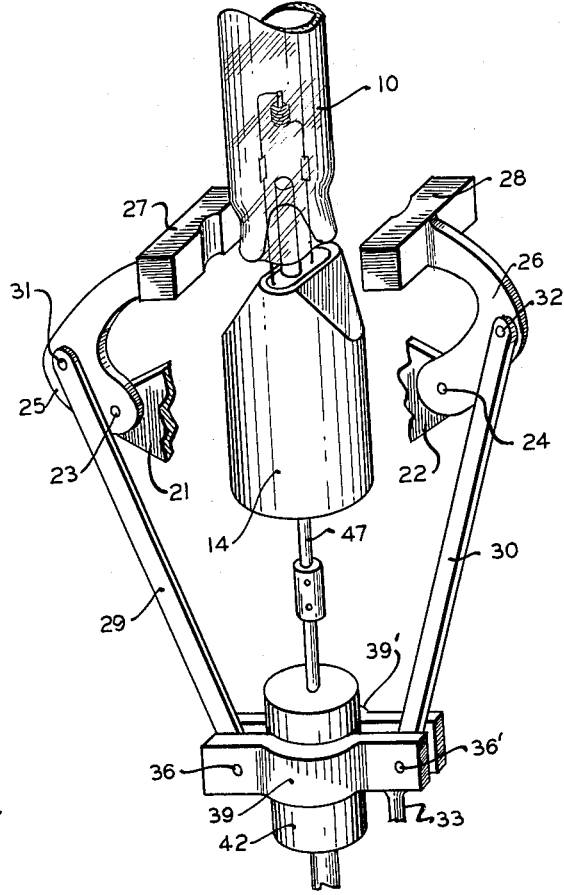
FIG. 5
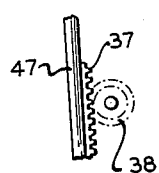
INVENTOR.
CHARLES EISLER
BY
ATTORNEY

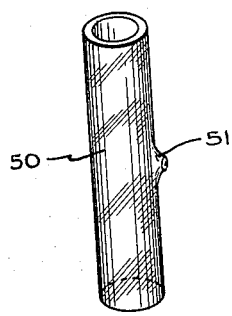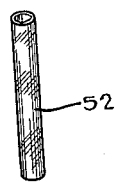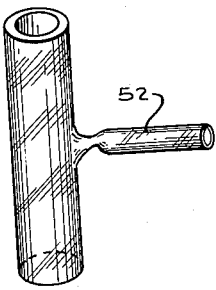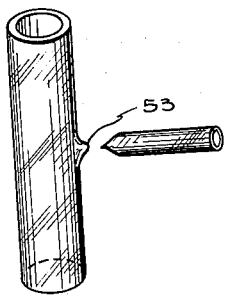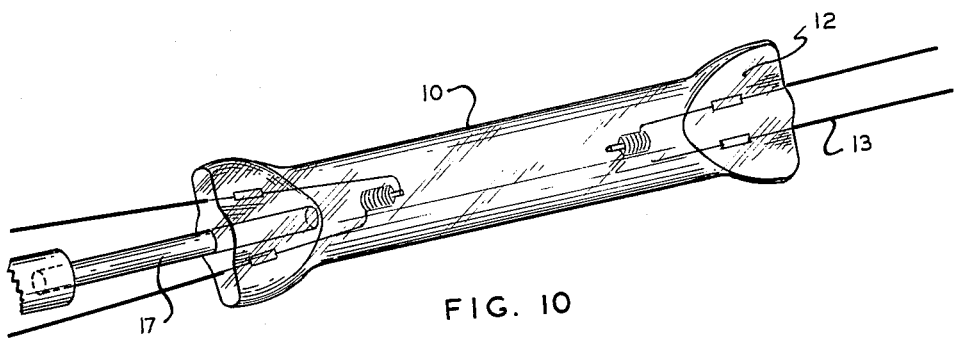

United States Patent Office 3,260,583
Patented July 12, 1966

3,260,583
METHOD OF SEALING GLASS TUBES
Charles Eisler, East Orange, N.J. (% Eisler Engineering Co., 760 S. 13th St., Newark, N.J.)
Filed Feb. 21, 1963, Ser. No. 260,201
1 Claim. (Cl. 65—34)

This invention relates to vacuum tube sealing procedure and is especially adapted for the sealing of quartz tubes which will soften and flow when heated and then solidify on cooling and is especially useful as an exhausting and sealing procedure for the sealing of mercury in a quartz envelope or tube. It was customary, in the prior art (FIGS. 6–19) to seal such tube 50 at both ends to form the tube with an integral apertured boss 51 in the wall thereof (FIG. 6) and a second length of tubing 52 (FIG. 7) of smaller diameter being first fused thereto (FIG. 8); then through this second length of tubing 52 the main body 50 of the tube was exhausted; the second length of tubing 52 was then cut off (FIG. 9). At the point of exhausting and sealing the tube a protuberance 53 remained, marring the appearance of the tube and providing an extended point in danger of fracturing, and objectionable from a safety and esthetics viewpoint. Furthermore such procedure required the use of much room to accommodate the T formation.

The method and apparatus of this invention obviate this form of procedure by effectively closing and sealing one end of such tube without an any way impairing the side walls of the tube; the finished tube is effectively exhausted and sealed at the open end thereof.

The invention provides novel means for effectively exhausting and sealing the open end of the tube by a procedure, well adapted to quantity uniformly reliable procedure, well adapted to quantity production and for use with uniformly successful results, obviating the disadvantages of procedures of the prior art such as that above described.

The drawings, illustrating procedures and devices useful in carrying out the invention, and the description below, are exemplary only of the invention, which shall be deemed to cover all other devices and procedures coming within the scope and purview of the appended claim.

In the drawings, wherein similar reference characters indicate like parts:

FIG. 1 is a fragmentary, perspective view of a tube having an open end thereof to be positioned on a holder in the initial step of forming the tube pursuant to the invention, with a second length of tubing of smaller diameter about to be inserted into said open end, FIG. 2 is a similar view of said parts, assembled, FIG. 3 is a further perspective view of said parts, showing an open end of a tube being heated and pressure closing means about to be applied thereto, FIG. 4 is a further perspective view of said parts, showing the pressure means closed on the heated open end of a tube to cause the molten tube end to close into sealing relation with the second length of tubing therein, FIG. 5 shows the position of the parts on opening of the compression means, FIG. 6 is a perspective view of a tube formed pursuant to prior art procedures, with an extended open boss on the side wall thereof, FIG. 7 is a perspective view of a short length of tubing to be fused to said apertured boss, FIG. 8 shows the short length of tubing fused to the main length of tube, FIG. 9 is a perspective view showing the short length of tube severed from the main length on completion of the exhausting, and sealing step, and FIG. 10 is a perspective view of a tube formed pursuant to this invention.

The invention has special reference to sealing of mercury in a quartz envelope or tube. As shown in the drawings, pursuant to the invention, a first length of tubing 10 has an open end 11. The opposite end 12 (FIG. 10) of said length of tubing 10 may be closed or preformed closed and may have a lead in wire 13 extending thereinto and therefrom in sealed relation thereto. The end 11 of tube 10 is positioned on holder 14 (FIG. 1) having an axial opening 15 therein for reciprocation therein of a pin 47.

A second length of tubing 17 (FIG. 1) of smaller diameter than the tubing 10 is positioned in the recess 16 of the holder 14, to constitute the exhaust tube, with the pin 47 reciprocably disposed therein and initially projecting therethrough (FIG. 2). On assembly of the parts, the filament 18 may be positioned in telescopic relation to the second length of tubing 17 (FIG. 2) and with said second length of tube extending into the tube 10 through the open end 11 thereof coaxially and partly outwardly therefrom and with the pin or rod 47 projecting into the second length of tubing (FIGS. 1–3). With the parts assembled as in FIG. 2 the tube 11 may be exhausted, filled with mercury and sealed in accordance with the procedure illustrated in FIGS. 3, 4, 5 and below described.

The holder 14 may be positioned on any suitable support 20 (FIG. 3) said support also having fixed thereto the brackets 21, 22, serving as bearings for the pivot pins 23, 24 of the links 25, 26 having fixed thereto the jaws 27, 28, said links being actuated by rods 29, 30 pivotally connected to said links as at 31, 32. The rods 29, 30 may be actuated by any suitable actuating means such as the bar 33 (FIGS. 3, 4, 5) which may be actuated by a rack 34 (FIG. 4) fixed to said bar, in turn actuated by a pinion 35 (driven from a suitable power source) in timed sequence to a mechanism for actuating pin 47 as, for example, a rack 37 fixed to said pin (FIG. 4) and actuated by a pinion 38, preferably in timed sequence to the actuation of the bar 33 in accordance with the following procedure:

Bar 33 has pivotally connected thereto as at 36, 36', the rods 29 and 30, said bar having fixed thereto circular extended bracket arms 39, 39' (FIG. 4) movable on an aligning block 42 in which the pin or rod 47 is also movable. On assembly of the parts (FIGS. 2 and 4) the open end 11 of the tubing 10 is positioned on the holder 14 and a smaller second tubing 17 is partly inserted into and partly projects from the tubing 10 (FIG. 2). Tubing 10 may be further engaged by positioning means 40, 41 (FIG. 3). Heating means 43 (FIG. 3) which may be an oxygen burner whose flame 44 is directed against the said open end of the tubing or other heating means, is used to cause the free end of the tubing to soften. The pin 47 is withdrawn from the second length of tubing while the jaws 27, 28 are moved inwardly against the end of the tubing 10 to compress the same about the second length of tubing 17. The rod or pin 47 is withdrawn out of the tube 10 (FIG. 5) concurrently with completion of the tube end heating and compression step, with continued heating of said free end of tubing 10. The tubing 17 and the tube 10 then form a homogeneous end (FIG. 5). Suitable exhausting means may be used through tubing 17. The extending end (FIG. 10) of the tubing 17 may be cut off by any suitable means and smoothly terminated as by heat or other means. The finished tubing (FIG. 10) will then be completely free of any of the side wall protuberances prevalent in the procedures (FIGS. 6–9) common to this art heretofore.

Exhausting of the main tubing 10, when the second tubing was affixed thereto as in FIG. 8 (the prior art) necessitated positioning the composite T tubes thus formed spaced apart on the exhaust apparatus due to the spacing necessitated by the T form of the tube; ends of the tube of the present invention to be exhausted may be positioned side by side in compact form, without any appreciable spacing, thus facilitating the exhausting of the tubing and requiring less room for the procedure.

Having thus described my invention, what I claim as new and desire to secure by Letters Patent is:

The method of assembling a quartz envelope for a vacuum tube, comprising the steps of:

(a) providing a hollowed support member with an opening at the top thereof and through which two filaments are extended;

(b) positioning a quartz tube envelope with an open bottom end and a closed top end over said tube filaments and resting the bottom open end of said quartz envelope on the top of said support member;

(c) inserting a small diameter elongated quartz tube up through the opening in said support and partially inside said quartz envelope;

(d) moving a pin member up through said quartz tube with the upper tip thereof extending into said quartz envelope by means of a rack assembly;

(e) heating the quartz envelope adjacent its bottom end;

(f) compressing said bottom end of said quartz envelope between a pair of jaws activated by a rack and pinion assembly;

(g) withdrawing said pin from said quartz tube by reversing the action of the rack assembly as the bottom end of quartz envelope is compressed against said quartz tube; and (h) continuing application of heat and pressure on the bottom of said quartz envelope to close and seal it about said quartz tube.

References Cited by the Examiner

UNITED STATES PATENTS

| 1,637,989 | 8/1927 | Eisler | 65—140 |
| 1,730,926 | 10/1929 | Fitch | 65—138 |
| 2,449,637 | 9/1948 | Blake et al. | 65—34 X |
| 2,945,327 | 7/1960 | Malm et al. | 65—155 X |

DONALL H. SYLVESTER, *Primary Examiner.*

F. W. MIGA, *Assistant Examiner.*